US008162353B1

(12) United States Patent
Mannoia

(10) Patent No.: US 8,162,353 B1
(45) Date of Patent: Apr. 24, 2012

(54) GAME OF CHANCE USING POSTAGE STAMPS

(76) Inventor: Jack Mannoia, Peru, VT (US)

( * ) Notice: Subject to any disclaimer, the term of this patent is extended or adjusted under 35 U.S.C. 154(b) by 713 days.

(21) Appl. No.: 12/328,920

(22) Filed: Dec. 5, 2008

(51) Int. Cl.
G09F 3/00 (2006.01)
(52) U.S. Cl. ............... 283/71; 283/67; 283/903
(58) Field of Classification Search ............ 283/67, 283/71, 903; 705/14.1, 14.14
See application file for complete search history.

(56) References Cited

U.S. PATENT DOCUMENTS

| 4,174,857 | A | | 11/1979 | Koza | |
|---|---|---|---|---|---|
| 4,725,077 | A | * | 2/1988 | Fujita | 283/67 |
| 5,874,499 | A | * | 2/1999 | Shipston et al. | 524/506 |
| 5,887,906 | A | | 3/1999 | Sultan | |
| 5,988,688 | A | * | 11/1999 | Such | 283/100 |
| 6,056,289 | A | * | 5/2000 | Clapper, Jr. | 273/138.2 |
| 6,293,037 | B1 | * | 9/2001 | Spada et al. | 40/638 |
| 6,305,687 | B1 | | 10/2001 | Pollock et al. | |
| 6,839,691 | B2 | * | 1/2005 | Bator et al. | 705/59 |
| 6,923,445 | B2 | * | 8/2005 | Such | 273/269 |

FOREIGN PATENT DOCUMENTS

CA 1275171 4/1985
* cited by examiner

Primary Examiner — Joanne Silbermann
Assistant Examiner — Christopher e Veraa
(74) Attorney, Agent, or Firm — Brian Roffe

(57) ABSTRACT

Postage stamp assembly includes a backing substrate having a front face and indicia relating to a game of chance on the front face, a postage stamp having a printed postage value thereon, and adhesive for removably adhering the postage stamp to the front face of the backing substrate. The indicia relating to a game of chance is exposed only when the postage stamp is removed from the backing substrate. The postage stamps are sold at a price higher than the printed postage value and money from the difference between the printed postage value of the postage stamps and the price thereof forms a pool, at least a part of which is used for prizes for the game of chance. Part of the pool might also be used for a charitable purpose or societal benefit, and an indication to this effect printed on the postage stamps.

15 Claims, 3 Drawing Sheets

GAME OF CHANCE USING POSTAGE STAMPS

FIELD OF THE INVENTION

The present invention relates to a game of chance using postage stamps and a method for conducting a game of chance using postage stamps.

BACKGROUND OF THE INVENTION

Postage stamps are a very common product which are used on an almost daily basis. Currently, the postage stamps are often the peel-off kind wherein the postage stamp is removably adhered to a backing substrate and when it is desired to affix the postage stamp to an envelope, the postage stamp is removed from the backing substrate, while retaining some of the adhesive thereon, and affixed to the envelope.

The postage stamps have a printed postage value thereon and to mail a letter, the letter must have one or more postage stamps with a cumulative printed postage value amounting to the required postage value to mail the letter based on its weight and/or size. Some stamps are sold for a price higher than the printed postage value with the difference being used to support a charitable cause. For example, there is a postage stamp the purchase of which supports breast cancer research. This postage stamp has a printed postage value required to mail a one ounce letter but costs more. By purchasing such stamps, the purchaser gives the difference between the printed postage value of the stamp and the price of the stamp to a fund which supports breast cancer research.

There is no other known purpose for the difference between the printed postage value of postage stamps and the price of the postage stamps.

OBJECTS AND SUMMARY OF THE INVENTION

It is an object of the present invention to provide a new use for the difference between the printed postage value of postage stamps and the price of the postage stamps, namely to form a pool for a game of chance played through use of the postage stamps themselves.

In order to achieve the above object and others, a postage stamp assembly in accordance with the invention includes a backing substrate having a front face and indicia relating to a game of chance on the front face, a postage stamp having a printed postage value thereon, and adhesive for removably adhering the postage stamp to the front face of the backing substrate to cover the indicia such that the indicia is exposed only when the postage stamp is removed from the backing substrate. The postage stamps are sold for a price higher than the printed postage value. Money from the difference between the printed postage value of the postage stamps and the price thereof forms a pool, at least a part of which is used for prizes for the game of chance. Part of the pool might also be used for a charitable purpose or societal benefit, and an indication to this effect printed on the postage stamps.

As such, at the post office or other site dispensing postage stamps, a consumer can select to purchase "regular" postage stamps, i.e., postage stamps whose price is the same as the printed postage value thereon, or the gaming postage stamps in accordance with the invention. In the latter case, the purchaser would be gambling or taking a chance that when they peel off the postage stamps, they may win a prize.

Another embodiment of a postage stamp assembly in accordance with the invention includes a backing substrate, a postage stamp having a printed postage value thereon and a price higher than the printed postage value, and adhesive for removably adhering the postage stamp to a front face of the backing substrate. The postage stamp includes indicia relating to a game of chance and covering material overlying the indicia such that the indicia is exposed only when the covering material is scratched off of or otherwise removed from the postage stamp.

A method for conducting a game of chance using postage stamps in accordance with the invention includes printing indicia relating to the game of chance on a backing substrate, printing a postage value on postage stamps, removably adhering the postage stamps to the backing substrate to cover the printed indicia such that the indicia relating to a game of chance is exposed only when each postage stamp is removed from the backing substrate, and selling the postage stamps for a price higher than the printed postage value. A pool of money is formed from the difference between the printed postage value of the postage stamps and the price thereof, and at least a part of the pool is used for prizes for the game of chance. Optionally, a part of the pool may be used for a charitable purpose or societal benefit and if so, an indication of the use of the pool for the charitable purpose or societal benefit may be printed on the postage stamps.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
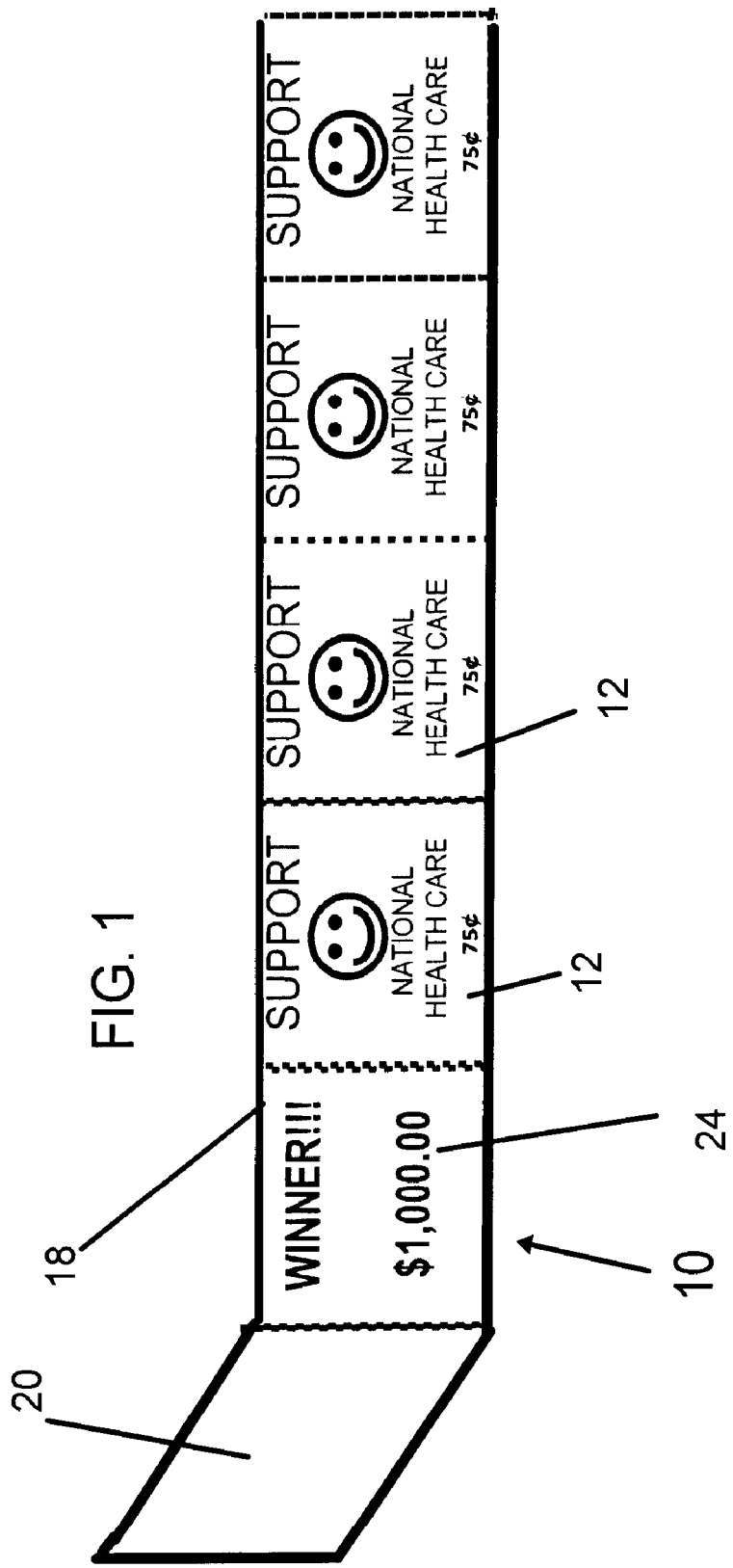
FIG. 1 is a view of a portion of a roll of postage stamps in accordance with the invention.
Figure 2:
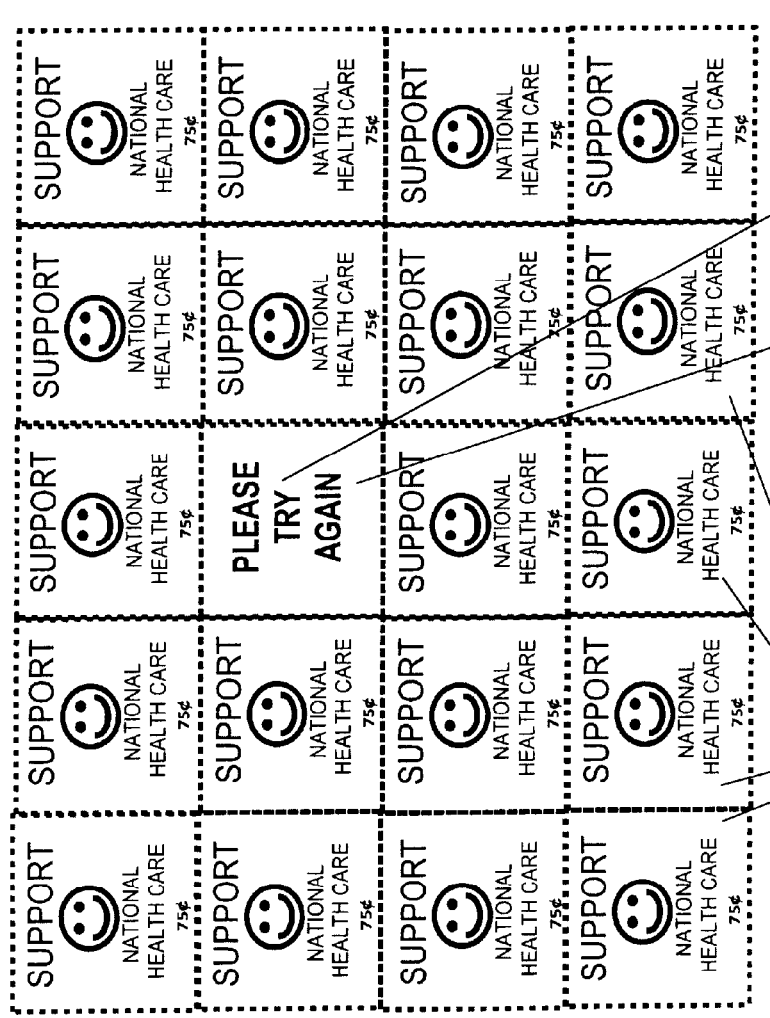
FIG. 2 is a view of a sheet of postage stamps in accordance with the invention.

Referring to the accompanying drawings wherein like reference numerals refer to the same or similar elements, FIG. 1 shows a roll 10 of peel-off postage stamps 12 incorporating the gaming system in accordance with the invention. FIG. 2 shows a sheet 14 of peel-off postage stamps 16, in a 4×5 matrix, which incorporates the gaming system in accordance with the invention. As is commonly known, the roll 10 of peel-off postage stamps 12 includes a backing substrate 18 and an adhesive 20 which causes the postage stamps 12 to adhere to the backing substrate 18 until they are ready for use and to an envelope for use. Similarly, the sheet 14 of peel-off postage stamps 16 includes a backing substrate 22 and an adhesive (not shown) which causes the postage stamps 12 to adhere to the backing substrate 22 until they are ready for use and then to the envelope for use. It is to be understood that the roll 10 and sheet 14 are merely examples of the manner in which the gaming system in accordance with the invention may be applied to postage stamps. The gaming system in accordance with the invention is not limited to use with postage stamps in a roll 10 or on a sheet 14 as shown and may be used in any manner in which postage stamps are dispensed, whether individually or as a group.

The gaming system in accordance with the invention entails the sale of special "gaming" postage stamps which have a printed postage value, for a price which is higher than the printed postage value, i.e., a postage stamp having a printed postage value of 75¢ has a sale price of $1.00. The difference between the printed postage value and the sale price is considered as part of a pool for use in the game of chance. This pool would therefore be formed from the expected total number of gaming postage stamps which are sold multiplied by the difference between the printed postage vale and the sale price of the postage stamps.

Specifically, at least part of this pool is distributed in the form of a gaming or lottery-type system to the purchasers of the postage stamps. Specifically, in the embodiment shown in FIG. 1, a front face of the backing substrate 18 of the roll 10 is selectively provided with indicia 24 relating to a prize, e.g., "Winner $1000", which is covered by the postage stamps 12. Various prizes and their frequency of occurrence depend on the odds determined by the printer of the roll 10, or the administrator of the game of chance, and the amount of money in the pool. The indicia 24 may be positioned on the front face of the backing substrate 12 such that each is directly underneath a single stamp 12 as shown in FIG. 1, or when the roll 10 is sold to a purchaser as a single unit, may be positioned under a plurality of adjacent stamps 12. By peeling off the stamp 12 for use, the purchaser will reveal the front face of the backing substrate 18 and will see the indicia 24 and thus if they have immediately won a prize from the pool to which they have contributed by purchasing postage stamps for a higher price than the printed postage value.

Since not all of the postage stamps 12 will uncover a prize after being peeled away from the backing substrate 18, the backing substrate 18 may be provided with indicia below one or more of the postage stamps 12 that the purchaser is not a winner and should try again. Thus, as shown in FIG. 2, the backing substrate 22 of the sheet 14 is provided with indicia 26 "Try Again".

Figure 3:
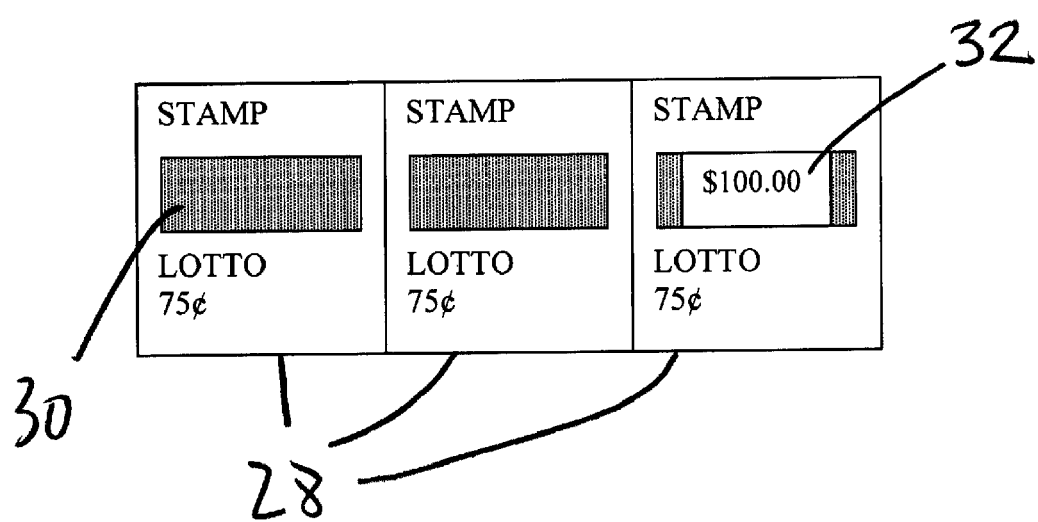
FIG. 3 is a view of a portion of another embodiment of a roll of postage stamps in accordance with the invention.

Instead of providing the backing substrate 18, 22 with indicia relating to the game of chance, i.e., winning of a prize or lack thereof, it is possible to form a postage stamp 28 with a scratch off area 30 formed from a covering material which when scratched, reveals a printed portion 32 of the postage stamp 28 which may indicate immediate winning of a prize, e.g., $100 as shown in the rightmost postage stamp in FIG. 3. When purchasing the postage stamps, the purchaser would have to ensure that no part of the scratched-off area 30 has been scratched-off. The conditions to obtain the prize may be printed on the back of the backing substrate of the postage stamps 28, printed on the front of the backing substrate and thus exposed when the stamp 28 is peeled off of the backing substrate, placed at the point of purchase of the postage stamps 28, and/or accessible over the Internet. The manner in which the scratch-off area 30 is formed may be any known manner for forming such a scratch-off area.

In any of the foregoing embodiments, the number of postage stamps which will reveal prizes to the purchasers depends on several factors, including the number of postage stamps printed, the difference between the printed value of the stamps and the price to purchase the stamps (which determines the size of the pool), the percentage of the pool allocated to the prizes, the value of the prizes, and other parameters known to those in the gaming field.

In one embodiment, at least part of the pool is also distributed to charitable organizations or other entities and an indication of this would be printed on the postage stamp. As shown in FIGS. 1 and 2, the postage stamps 12, 16 include the phrase "Support Health Care" so that part of the pool of money formed from the difference between the printed value of the postage stamps and the price to the purchasers would be donated to organizations which provide health care, e.g., for those unable to afford health care or for those who do not have adequate health care. The particular phrase will be different for different causes and there may be different phrases for the same cause, e.g., both "Support Health Care" and "Help the Health Care Crisis". Selection of the cause and the associated phrase(s) may depend on the area in which the postage stamps are sold, e.g., the cause may be a local cause, or current events, e.g., for a national or global crisis.

Therefore, in this embodiment, part of the pool is provided for charitable purposes or a societal benefit and part of the pool is paid out in the form of winning to the purchasers of the postage stamps. Part of the pool may also be used for administrative expenses to administer the game of chance.

Instead of having the postage stamps reveal an immediate monetary prize, or a tangible prize, the backing substrate 18, 22 or postage stamps 28 may be provided with a game piece to enable the purchaser to participate in a game and possibly win a prize if the purchaser obtains a certain amount and/or set of game pieces. For example, the indicia on the backing substrates 18, 22 or postage stamps 28 may be a letter, number or pattern and in order to win a prize, the purchaser must collect a predetermined set of different numbers, letters or patterns. For example, if the game piece is in the form of a latter, then the game would require the purchaser to spell a particular phrase, such as "POST OFFICE", i.e., the purchaser would have to obtain game pieces having each of the letters of this phrase in order to win a prize.

Any other type or form of game of chance may also be incorporated into postage stamps in the manner described above.

A method for conducting a game of chance using some of the above-described postage stamps would entail printing indicia relating to the game of chance on a backing substrate, e.g., a roll or sheet which will eventually be formed into a roll of postage stamps or a sheet of postage stamps, and removably adhering postage stamps to the backing substrate to cover the printed indicia such that the indicia relating to a game of chance is exposed only when each postage stamp is removed from the backing substrate. The manner in which self-adhesive postage stamps are formed is known to those skilled in the art.

However, differing from existing self-adhesive postage stamp manufacturing processes, a method in accordance with the invention entails printing a postage value on postage stamps, e.g., the required postage value to mail a one ounce standard letter, but selling the postage stamps for a price higher than the printed postage value, e.g., an extra 20¢. The difference between the printed postage value and the price to the purchaser is used to form a pool of money, at least a part of which is used for prizes for the game of chance. Another part may optionally be used for a charitable purpose or societal benefit. In this case, an indication of the use of the pool for the charitable purpose or societal benefit may be printed on the postage stamps.

The gaming postage stamps described above may be sold at the same locations as regular postage stamps, i.e., postage stamps sold for the printed postage value, so that each consumer can decide at the point of purchase whether to take a chance and purchase the gaming postage stamps or regular postage stamps.

Although it is preferable to sell the gaming postage stamps in accordance with the invention for more than the printed postage value, this does not necessarily have to be the case and they may be sold for the printed postage value. This might be applicable for promotional purposes or when the printed postage value incorporates a portion to be allocated to the game of chance.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for conducting a game of chance using postage stamps, comprising:
   printing indicia relating to the game of chance on a front face of a backing substrate;
   printing a postage value on postage stamps;
   removably adhering the postage stamps to the front face of the backing substrate to cover the printed indicia such that the indicia relating to a game of chance is exposed only when each postage stamp is removed from the backing substrate;
   selling the postage stamps for a price higher than the printed postage value;
   forming a pool of money from the difference between the printed postage value of the postage stamps and the price thereof; and
   using at least a part of the pool for prizes for the game of chance,
   the postage stamps being detachable from the backing substrate and affixable to an envelope to enable mailing of the envelope with affixed postage stamps to a recipient.

2. The method of claim 1, further comprising using at least a part of the pool for a charitable purpose or societal benefit.

3. The method of claim 2, further comprising printing an indication of the use of the pool for the charitable purpose or societal benefit on the postage stamps.

4. The method of claim 1, wherein the indicia includes an indication of immediate winning of a prize.

5. The method of claim 1, wherein the indicia includes a letter, number or pattern whereby a predetermined set of letters, numbers or patterns is required to win a prize.

6. The method of claim 1, further comprising forming a plurality of the postage stamps as a roll of postage stamps.

7. The method of claim 1, further comprising forming a plurality of the postage stamps as a sheet of postage stamps.

8. A method for conducting a game of chance using postage stamps, comprising:
   printing indicia relating to the game of chance on a front face of a backing substrate;
   printing a postage value on each of the postage stamps, the printed postage value on each postage stamp enabling use of that postage stamp as postage when affixed to an envelope to be delivered to a recipient if the envelope has sufficient postage for delivery to the recipient by a postal or delivery service;
   removably adhering the postage stamps to the front face of the backing substrate to cover the printed indicia such that the indicia relating to a game of chance is exposed only when each postage stamp is removed from the backing substrate;
   selling each postage stamp for a price higher than the printed postage value on each postage stamp;
   forming a pool of money from the difference between the printed postage value of the postage stamps and the sale price thereof; and
   using at least a part of the pool for prizes for the game of chance.

9. The method of claim 8, wherein the postage stamps are detachable from the backing substrate and affixable to the envelope to enable mailing of the envelope with affixed postage stamps to the recipient.

10. The method of claim 8, further comprising using at least a part of the pool for a charitable purpose or societal benefit.

11. The method of claim 10, further comprising printing an indication of the use of the pool for the charitable purpose or societal benefit on the postage stamps.

12. The method of claim 8, wherein the indicia includes an indication of immediate winning of a prize.

13. The method of claim 8, wherein the indicia includes a letter, number or pattern whereby a predetermined set of letters, numbers or patterns is required to win a prize.

14. The method of claim 8, further comprising forming a plurality of the postage stamps as a roll of postage stamps.

15. The method of claim 8, further comprising forming a plurality of the postage stamps as a sheet of postage stamps.

* * * * *